United States Patent [19]

Jonas et al.

[11] Patent Number: 5,246,974

[45] Date of Patent: Sep. 21, 1993

[54] BONDING, SEALING AND ADHESIVE COMPOSITION BASED ON SILICONE

[75] Inventors: Reinhard Jonas, Idstein/Wörsdorf; Herbert Muenzenberger, Wiesbaden/Bierstadt, both of Fed. Rep. of Germany

[73] Assignee: Hilti Aktiengesellschaft, Fürstentum Liechtenstein, Liechtenstein

[21] Appl. No.: 901,361

[22] Filed: Jun. 19, 1992

[30] Foreign Application Priority Data

Jun. 21, 1991 [DE] Fed. Rep. of Germany ....... 4120561

[51] Int. Cl.$^5$ .................................................. C08J 9/02
[52] U.S. Cl. ............................................. 521/82; 521/99; 521/154
[58] Field of Search .................. 521/154, 82, 99, 77

[56] References Cited

U.S. PATENT DOCUMENTS

| | | | |
|---|---|---|---|
| 4,189,545 | 2/1980 | Modic | 521/154 |
| 4,529,741 | 7/1985 | Bauman et al. | 521/154 |
| 4,572,917 | 2/1986 | Graiver et al. | 521/154 |
| 4,694,030 | 9/1987 | Von Bonin et al. | 521/154 |
| 4,719,249 | 1/1988 | Dietlein et al. | 521/154 |
| 4,738,988 | 4/1988 | Dietlein | 521/154 |
| 4,762,859 | 9/1988 | Modic et al. | 521/154 |
| 4,855,328 | 8/1989 | Smith | 521/154 |
| 4,871,782 | 10/1989 | Modic et al. | 521/154 |
| 4,879,317 | 11/1989 | Smith et al. | 521/154 |
| 4,943,596 | 7/1990 | Gross et al. | 521/154 |
| 4,954,533 | 9/1990 | Modic et al. | 521/154 |
| 4,978,705 | 12/1990 | Lamont | 521/154 |
| 5,071,885 | 12/1991 | Johnson | 521/154 |

*Primary Examiner*—Morton Foelak
*Attorney, Agent, or Firm*—Anderson Kill Olick & Oshinsky

[57] ABSTRACT

A foamable, curable composition or mass based on silicone is disclosed which comprises components which expand at higher temperatures and which do not burn or are difficult to burn. The mass is suitable for fireproofing, since the burning temperature leads to an expansion of these components. The mass can be used to seal or cover objects which are in danger of burning or can be formed into a finished, molded object or body and used as such.

3 Claims, No Drawings

BONDING, SEALING AND ADHESIVE COMPOSITION BASED ON SILICONE

FIELD OF INVENTION

The invention generally relates to curable masses or compositions based on silicone and is particularly directed to such masses which not only exhibit bonding, sealing and adhesive properties—hereinafter sometimes referred to as caulking masses—but also have a fire retarding action.

BACKGROUND INFORMATION AND PRIOR ART

Caulking masses based on silicone are used to a large extent for sealing purposes, as well as for bonding and adhesive purposes. Due to their inorganic components, they have a certain fire-inhibiting effect, which can be improved by the addition of known flame-retarding materials.

It has previously been proposed to use foamable silicone compositions for connecting parts or for sealing purposes, for example, for sealing pipeline and wiring openings as well as door or window frames in masonry or gaps or cracks in masonry and the like. Compared to other foams, such as polyurethane foams, which burn or "melt" in the event of a fire, the silicone foams have the advantage of higher stability under load. In addition, silicone foams do not release any toxic gases in the event of a fire. However, the behavior during fire conditions is by no means satisfactory. Soon after the outbreak of a fire, cracks develop in the "carbonizing" layer on the surface facing the fire. These cracks have a tendency soon to become deeper and finally they permit the fire to break through. The attempt to counteract the spread of the fire thus ultimately fails.

OBJECT OF THE INVENTION

It is the primary object of the present invention to provide caulking masses for bonding, sealing and adhesive purposes based on silicone, which have superior properties even in the event of a fire.

Another object of the present invention is to provide caulking compositions based on silicone, which contain, as silicone component, 1-, 2- or multi-component foamable silicones and, in addition, components which expand at the temperature of fire and do not burn or burn only under the most extreme conditions.

SUMMARY OF THE INVENTION

Pursuant to the invention, it has been ascertained that as silicone component of the 1-component or the multi-component systems, organopolysiloxanes, which can be foamed by blowing or foaming agents, give excellent results. Those siloxanes, which form elastomeric foams, are particularly preferred. However, siloxanes, which form rigid foams, can also be used with very good results. Examples of foamable silicones, which can be used within the scope of the present invention, are:

(a) mixtures of OH-functional and H-functional polysiloxanes and/or silanes, which release hydrogen during the reaction (cross-linking). The released hydrogen acts then as a blowing agent and foams the composition;

(b) mixtures of vinyl- or also hexenyl-functional and H-functional polysiloxanes and/or silanes, to which OH-containing substances, such as alcohols, are added. In so doing, the vinyl-/hexenyl-functional and the H-functional components are cross-linked in a poly-addition reaction, while the H-functional and OH-functional components form the hydrogen that is required for the foaming;

(c) the mixtures of (a) or (b), which are catalyzed with rhodium complexes that are far less inhibition sensitive than the platinum complexes are usually employed;

(d) the above-named mixtures, adjusted with MQ-silicone resins to special, predetermined hardness.

Further details of the compounds that can be suitably employed are described in Noll, *Technologie der Silikone* (Technology of Silicones), Verlag Chemie, 1960, and in *Silikone Chemie und Technologie* (Silicone Chemistry and Technology), Vulkan Verlag, 1989.

Suitable blowing agents are gases, such as hydrogen, carbon dioxide, nitrogen and the like, or compounds which decompose under the formation of blowing or foaming agents or which form blowing or foaming agents on being mixed with the silicones. These include, for example, azo compounds, such as azodicarbonamide. Also to be mentioned is liberated hydrogen which is formed by the reaction of Si-H-functional silanes and/or siloxanes with OH-containing substances, such as alcohols or polyols. The foaming can also be produced by low-boiling hydrocarbons, such as isoparaffins or by inert gases under pressure, such as nitrogen, which are stirred into the silicone composition. These additives then evaporate/escape during the curing and foam the composition. Conventional, moisture-curing compositions can also be cured in this manner. The foaming effect of the described compositions, which can be foamed with hydrogen, can also be increased further. These 2-component compositions, which are foamed by hydrogen, can also be produced as a 1-component composition. This requires that the catalyst, necessary for the reaction, is inhibited under the usual storage conditions, for example, by being encapsulated.

Organic and/or inorganic compounds come into consideration as materials which do not burn or burn only with great difficulty and expand at the burning temperature. These include, in particular, expanding graphite, vermiculite, expandable alkali silicates, phosphates, such as ammonium phosphates, polyphosphates, phosphonates, and materials containing water of crystallization, such as aluminum hydroxides and carbonates, particularly calcium carbonates. Generally, mineral materials with layered lattice structure are preferred.

The content of materials which expand at the burning temperature generally is between 1 and 60% by weight, based on the total weight of the mass. Compositions containing 5 to 40% by weight and particularly 8 to 35% by weight of expanding materials are preferred. The materials expanding at the burning temperature, are preferably present in finely divided form, with average particles ranging from 0.01 to 3 mm and, particularly, from 0.1 to 1 mm. The viscosity of the composition can be controlled by the amount and particle size of the materials expanding at the burning temperature. This is of particular importance for applying the compositions on walls and overhead.

The inventive compositions or masses may also contain additives, such as fillers, for example, in spherical, hollow spherical, laminar or fibrous form as well as viscosity modifying agents, such as pyrogenic silica, fly ash, dyes, solvents, etc.

The inventive compositions can be produced as 1-component, 2-component or multi-components. In the case of 2-component or multi-component systems, foaming usually occurs through mixing the components. In the case of 1-component systems, a foaming agent is generally supplied.

It is also within the scope of the invention to shape or mold the inventive mass into bodies.

The following examples are intended to explain the invention in greater detail, it being understood, however, that they are given way of illustration and not by way of limitation.

EXAMPLE 1

(Percentages are % by weight)

| Part A | |
|---|---|
| Rhodorsil RTV 1593 A [1] | 80% |
| pyrogenic silica [2] | 5% |
| expanding graphite [3] | 10% |
| natural chalk [4] | 5% |
| Part B | |
| Rhodorsil RTV 1593 B [1] | 80% |
| pyrogenic silica [2] | 6% |
| expanding graphite [3] | 10% |
| natural chalk [4] | 4% |

[1] silicone foam from Rhone Poulenc (consistency: liquid)
[2] coated with methylpolysiloxane, such as Aerosil R 202 (Degussa)
[3] Sigraflex FR 90-60/80 of the Sigri Company
[4] Carborex 10 of the Omya Company

PREPARATION

The fillers are stirred consecutively in the sequence chalk/expanding graphite/silica into the liquid silicon (Rhodorsil) in a vacuum vertical paint miser (Drais). This is done separately for parts A and B, resulting in two batches. After stirring until smooth and evacuating, the mixtures are packaged into 2-component coaxial cartridges.

Application

The mass is forced out of the 2-component coaxial cartridge into a static mixer and pressed into joints and holes. This is done with appropriate squeeze guns.

Mixing ratio of part A:part B=1:1

EXAMPLE 2

A silicone foam, as used in Example 1 as a base material, is produced as follows:

(Percentages are % by weight)

| Part A: | |
|---|---|
| α, ω-dihydroxypolydimethylsiloxane | 99.9% |
| organic platinum complex | 0.1% |
| Part B: | |
| α, ω-dihydroxypolydimethylsiloxane | 80% |
| SiH-functional polydimethylsiloxane | 20% |

As hydroxy-functional polysiloxane, a polymer with a viscosity of about 5,000 cp can be used while as Si-H-functional polysiloxane, a 5-functional siloxane with eight Si-O units may be used.

What is claimed is:

1. A curable bonding, sealing and adhesive mass based on organic polysiloxane, comprising an effective amount of a foamable mixture of OH-functional and H-functional polysiloxanes releasing hydrogen during cross-linking and finely divided expandable graphite in between about 8 and 35% by weight of the total mass.

2. A shaped or molded body comprising the mass of claim 1.

3. The shaped or moded body of claim 2, wherein the mass comprises a organic polysiloxane which forms an elastomeric foam.

* * * * *